United States Patent [19]

Perlaky

[11] 4,098,694

[45] Jul. 4, 1978

[54] METHODS AND COMPOSITIONS FOR DISPERSING OIL FILMS

[75] Inventor: Charles Perlaky, Crafton Borough, Pa.

[73] Assignee: United States Steel Corporation, Pittsburgh, Pa.

[21] Appl. No.: 306,092

[22] Filed: Nov. 13, 1972

[51] Int. Cl.$^2$ .................. B01F 17/34; B01F 17/36; C02C 5/02
[52] U.S. Cl. ................... 210/59; 210/DIG. 27; 252/312; 252/356; 252/357; 252/DIG. 1; 252/DIG. 6
[58] Field of Search ......... 252/312, 356, 357, DIG. 1, 252/DIG. 6; 210/DIG. 21, 59, DIG. 27; 260/617 HF

[56] References Cited

U.S. PATENT DOCUMENTS

| | | |
|---|---|---|
| 1,993,737 | 3/1935 | Graves et al. ............... 252/356 X |
| 2,768,139 | 10/1956 | Young et al. ............ 260/617 HF X |
| 2,867,585 | 1/1959 | Vitale ............................. 252/135 |
| 3,577,340 | 5/1971 | Paviak et al. .............. 252/312 X |
| 3,625,857 | 12/1971 | Weimer et al. .................. 252/312 |

*Primary Examiner*—Richard D. Lovering
*Attorney, Agent, or Firm*—John E. Callaghan

[57] ABSTRACT

Thin oil films on water can be dispersed by the action of a non-ionic dispersant and organic, water-insoluble oxygenated compounds. The oxygenated compounds may be such things as oxo alcohol bottoms or alcohol and ester mixtures.

12 Claims, No Drawings

METHODS AND COMPOSITIONS FOR DISPERSING OIL FILMS

BACKGROUND OF THE INVENTION

Wastewater from many industrial processes contains minor amounts of oil. When the wastewater is discharged into a larger body of water, e.g. a river, the oil will form a thin iridescent film on the body of water. This film is highly visisble because it reflects light into myriad colors. Although it may otherwise not be objectionable for biodegradability because the oil is in such low concentration, the high visibility of the oil sheen creates a dispersion problem. It is difficult to disperse such films by the use of soaps or surfactants because of the costs of these materials or the ineffectiveness of these materials or foaming when such materials are used.

OBJECTS OF THE INVENTION

It is among the objects of this invention to provide compositions and methods for dispersing thin oil films in water by the use of non-ionic dispersants dissolved in large proportions of organic water-insoluble oxygenated compounds. Further, this invention is to provide such compositions that will disperse oil films but are also biodegradable, non-foaming, relatively inexpensive, and are generally unseparated mixtures of alcohols, esters, aldehydes and/or other carbonyl compounds. In addition, it is an object of the invention to improve the performance of non-ionic dispersants by combining such dispersants with oxygenated compounds for dissipation of oil films. Also, this invention is directed towards providing simple means for mixing the dispersing composition with the oil-covered water body. These and other objects as may be readily apparent from the following description of the invention are to be achieved by the practice of the invention.

DESCRIPTION OF THE INVENTION

The invention in general provides for the dispersion of thin films of oil on water by the use of a composition which is a solution having from about 3 to about 50% by weight of a non-ionic dispersant and from about 50 to about 97% of a water-insoluble, oxygenated organic compound. This composition is mixed with either the body of water containing the oil film or it is mixed with a stream feeding such a body so that the oil film is dispersed.

The non-ionic dispersant utilized in this invention may be a fatty acid condensate of an alkanolamine or poly-alkylene glycol ethers or poly-carboxylic acid esters or mixtures of these. It is important that this dispersant be soluble in the oxygenated organic compounds hereinafter described. An example of such a fatty acid condensate of an alkanolamine is Tretolite WC-26, commercially available from Betz Laboratories. A poly-carboxylic fatty acid ester such at Betz 407 is an example of another dispersant found soluble in the oxygenated compounds. Ethylene glycol mono-methyl ether is a non-ionic dispersant equally useful for the practice of the invention.

The water-insoluble oxygenated organic compounds are generally present from about 50 to about 97% by total weight of the solution containing the non-ionic dispersant. The higher percentages of oxygenated organic compounds are especially desirable because of the relatively high cost of the non-ionic dispersant component of the solution. The oxygenated organic compounds may comprise mixtures of alcohols and esters in which the alcohols have from 4 to about 13 carbon atoms, and the esters are the alkyl or aromatic acid esters of such alcohols. The oxygenated compounds may also be oxo bottoms such as are obtained from the production of oxo alcohols having from 6 to 13 carbon atoms.

The mixture of alcohols and esters may be obtained as the overhead from esterification processes to form sebacic, adipic or phthalic ester plasticizers. Generally, the alcohols include linear and iso $C_4$ to $C_{13}$ alcohols; especially butanol, linear $C_6$ to $C_{10}$ alcohols, iso-octyl, isodecyl and tri-decyl alcohols. The compositions will generally have from 65 to 90% by weight of alcohol and 10 to 35% by weight of the ester of these alcohols. Particularly desirable are the esters selected from the group of adipates, sebacates or phthalates. The alcohol-ester composition will generally be a straw colored material, have a specific gravity less than 1 and be immiscible with water. A convenient source of such alcohol-ester mixtures is the collected overheads from esterification of sebacic, adipic or phthalic acid. Collected overheads from these esterifications may be condensed and re-esterified with phthalic acid; the overhead from this second esterification may be collected. The alcohol-rich layer from the collected overheads is decanted to give a composition which is an oxygenated-organic compound suitable for use with non-ionic dispersants.

The oxygenated-organic compounds which are obtained as oxo bottoms are well known in the art. Oxo bottoms are complex mixtures of alcohols, aldehydes, ketones, esters and other types of compounds which can be derived from these carbonyls. See for example, *Higher Oxo Alcohols*, Lewis F. Hatch, John Wiley & Sons, Inc., New York, 1957, especially pp. 24 and 25 and the references cited therein. See also U.S. Pat. No. 2,648,694, Mason, for a description of oxo bottoms. A suitable source for the oxo bottoms to be used in the practice of the invention is from the hydroformylation of olefins having 7 to 9 carbon atoms in their molecules. The oxo bottoms will have a predominate amount of aldehyde dimers and trimers and a lesser amount of alcohol. For example, the $C_{10}$ oxo alcohol bottoms will have dimers and trimers of the $C_{10}$ aldehyde and up to 30% by weight of the $C_{10}$ alcohol.

The thin oil films may have a concentration of up to about 100 ppm of oil in the water. Usually, the oil concentration will be about 10 ppm per unit weight of the body of water. The oil may be a petroleum oil, a vegetable oil or a coal tar oil. The composition will generally be applied in an amount of from 10 to 100% by weight of the concentration of the oil. The lower percentages are preferred because of the lower cost involved in dispersing the oil film.

Generally, the non-ionic dispersant will be dissolved into the water-insoluble oxygenated organic compound and this composition will then be added to the body of water. The composition may be added to the water by pouring into the body or spraying onto the surface. Surface agitation such as by waves or winds will disperse the compositions into the body to disperse the thin oil film. The absence of the visible sheen indicates the oil film has been effectively dispersed. Generally, the oil films are in such low concentrations that they are biodegradable; the oxygenated-organic compounds are themselves biodegradable. Generally, about 1 ppm of the composition will increase the biodegradable level of the body of the water by about 0.77 ppm. The compositions may also be applied to an effluent stream containing oil and water which discharges into a larger body of water. The following examples illustrate the practice of the invention.

EXAMPLE 1

A non-ionic dispersant (commercially available under the name of WC-26 from Betz Laboratories, Inc.) said to be an alkanolamine, and believed to be a condensate of fatty acids and an alkanolamine and having about 16 carbon atoms, is mixed with a water-insoluble oxygenated compound in the form of a mixture of alcohols and esters. These alcohols and esters are obtained from the overheads during the esterification of sebacic, adipic and phthalic acids with $C_4$ and $C_{6-10}$ linear alcohols, iso-octyl, iso-decyl and tri-decyl alcohols. The mixture of alcohols and esters has the following composition:

| Saponification Number | 22.8 g. KOH/g. sample | |
|---|---|---|
| Ester by weight (mostly phthalates) | 8.4% | |
| Alcohols by weight | $C_4$ - 5.1% | (4.2% isobutyl) |
| | $C_6$ - 3.6% | (3.1% normal) |
| | $C_8$ - 41.2% | 23.5% 2-ethyl-hexyl |
| | | 5.9% normal |
| | | 5.9% iso-octyl |
| | $C_{10}$ - 27% | (5.4% normal) |
| | $C_{13}$ - 6.8% | |
| Hydrocarbons by weight | 6.8% | 3.1% $C_8$ |
| | | 2.1% $C_{10}$ |
| Boiling Point | 165° C at 20 mm Hg. absolute | |

The dispersant is mixed with the oxygenated-organic compound to form a solution and is then applied to a stream having about 7 ppm of oil. The non-ionic dispersant compound is present in concentrations of about 33%, 25%, 20%, 16% and 8% by weight of the solution. It is applied to the water stream in an amount equal to about 25% by weight of the oil concentration. There is no visible foaming and the oil sheen on the body of water disperses.

EXAMPLE 2

The non-ionic dispersant of the same type as that being used in Example 1 is mixed with about 93% by weight of oxo bottoms. The oxo bottoms were obtained from the hydro-formylation of nonenes in the production of iso-decyl alcohols. These oxo bottoms have a saponification number of 31.1 mg KOH/g. of sample; an acid number of 7.66 mg KOH/g. of sample; a hydroxyl number of 29.8 mg KOH/g. of sample; an average molecule weight of 329; percentage carbon equal to 80.05%; percentage hydrogen equal to 13.36%; percentage oxygen equal to 7.50%. This mixture of oxo bottoms and non-ionic dispersant are added at a rate of 0.6 ppm to a stream of water having about 7 ppm of oil. No visible sheen is observed on the body of water from oil slick nor is any foaming apparent.

EXAMPLE 3

In a similar manner, ethylene glycol mono ethyl ether and ethylene glycol mono-methyl ether are added separately and in combination with equal parts of the alcohol of Example 1. This mixture is applied to an oil film on water in which the oil concentration is about 6 ppm and the dosage rate is about 0.6 ppm. The oil film is dispersed. A particular advantage of this mixture is that it has a pour point below −10° F and can be used successfully at these low temperatures.

As has been described, this invention provides a relatively inexpensive, non-foaming composition for dispersion of oil films on water. A particular feature is its utilization of mixtures of alcohols, esters or aldehydes as a major component of the composition. While this invention has been described in terms of specific examples, variations in formulation or steps of application such as would be deemed equivalents by one skilled in the art are equally within the spirit of the invention.

I claim:

1. An oil film dispersing composition comprising a solution of
    (a) about 3 to about 50% by weight of a non-ionic dispersant selected from the group consisting of fatty acid condensates of an alkanol amine, polyalkylene glycol ethers, poly-carboxylic acid esters and mixtures of the same, and
    (b) about 50 to about 97% by weight of a water-insoluble oxygenated organic compound, said oxygenated organic compound being selected from the class of
        1. mixtures having 65 to 95% by weight of mixed alcohols having 4 to 13 carbon atoms in their molecule and 5 to 35% by weight of alkyl or aromatic acid esters of said alcohols, and
        2. oxo bottoms obtained from the production of oxo alcohols having 6 to 13 carbon atoms, and
        3. mixtures of 1 and 2.

2. The composition of claim 1 wherein said alcohols include butyl, octyl, decyl, iso-octyl and iso-decyl alcohols.

3. The composition of claim 1 wherein said esters include adipates, sebacates and phthalates.

4. The composition of claim 1 wherein said oxo bottoms are obtained from the production of iso-decyl and iso-octyl alcohols.

5. The composition of claim 1 wherein said non-ionic dispersant is selected from the group consisting of alkanolamide condensates with fatty acids, ethylene glycol ethers, and polycarboxylic acid esters.

6. The composition of claim 5 wherein said non-ionic dispersant includes an alkanolamide having about 16 carbon atoms in its molecule.

7. The composition of claim 1 wherein said oxygenated organic compound of (b) 1 is obtained from the overhead vapors produced during esterification of said alcohols.

8. The composition of claim 7 wherein said esterification is the esterification of adipic, sebacic, or phthalic acids.

9. The composition of claim 1 wherein said water-insoluble oxygenated organic compound comprises at least about 75% by weight of said solution.

10. A method for dispersing oil films on bodies of water wherein said oil has a bulk concentration in said water of less than about 100 ppm of oil comprising the steps of:
    (i) forming a solution of
        a. about 3 to about 50% by weight of a non-ionic dispersant selected from the class consisting of fatty acid condensates of an alkanol amine, polyalkylene glycol ethers, poly-carboxylic acid esters, or mixtures of the same, and
        b. about 50 to about 97% by weight of a water-insoluble oxygenated organic compound, said oxygenated organic compound being selected from the class of 1. mixtures having 65 to 95% by weight of mixed alcohols having 4 to 13 carbon atoms in their molecule and 5 to 35% by weight of alkyl or aromatic acid esters of said alcohols, and
2. oxo bottoms obtained from the production of oxo alcohols having 6 to 13 carbon atoms, and
3. mixtures of 1 and 2, and (ii) adding the solution of step (i) to the mixture of oil and water in an amount sufficient to disperse said oil film.

11. The method of claim 10 wherein said solution is added to a first body of water and said first body of water flows into a second body of water containing less than 100 ppm of oil in the form of a film.

12. The method of claim 10 wherein said solution is sprayed onto said body of water having said oil film.

* * * * *